Aug. 4, 1970  S. BOTSFORD  3,522,613
WASTE DISPOSAL SYSTEM
Filed Oct. 21, 1968  5 Sheets-Sheet 1
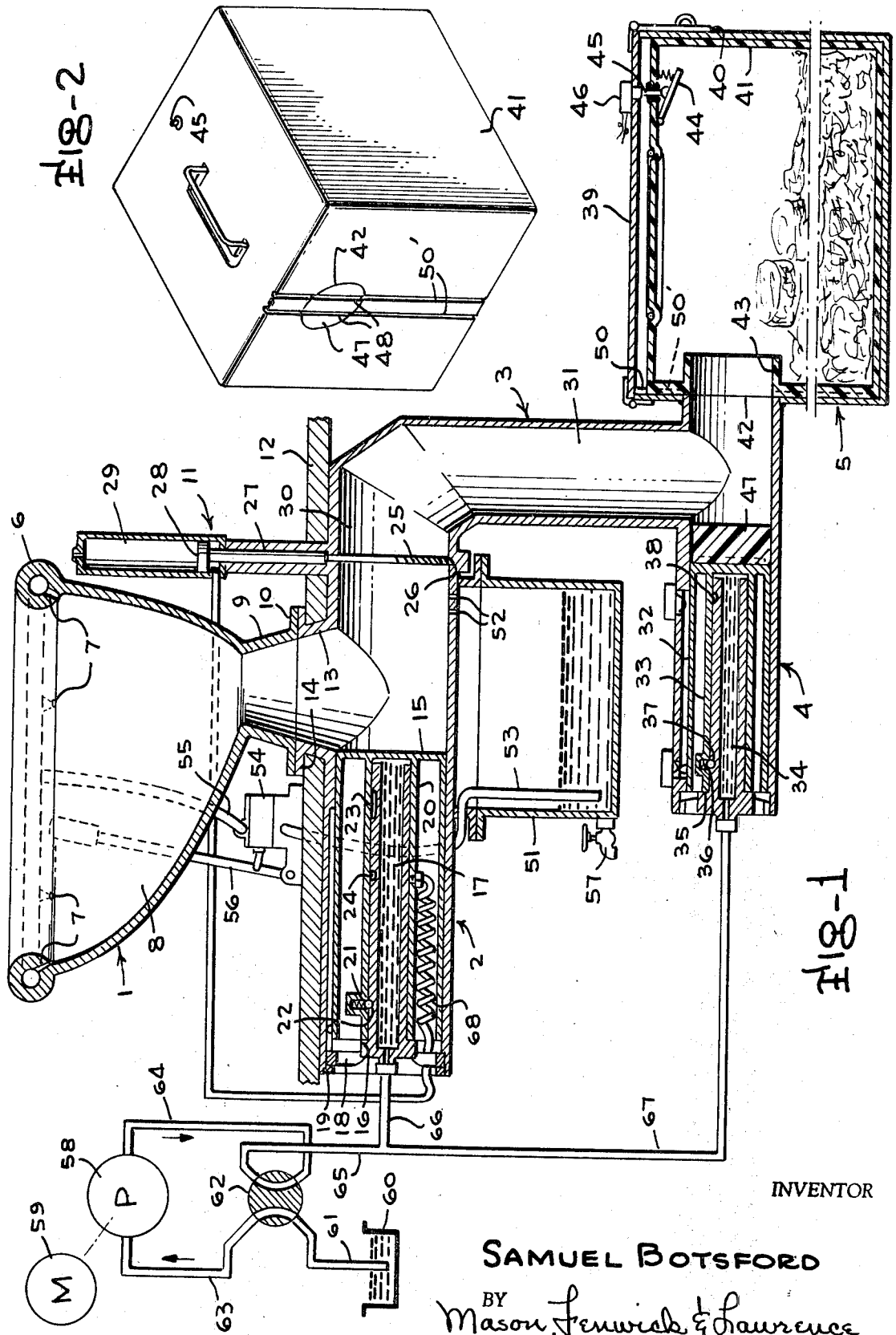
INVENTOR
SAMUEL BOTSFORD
BY Mason, Fenwick & Lawrence
ATTORNEYS Aug. 4, 1970  S. BOTSFORD  3,522,613
WASTE DISPOSAL SYSTEM
Filed Oct. 21, 1968  5 Sheets-Sheet 2
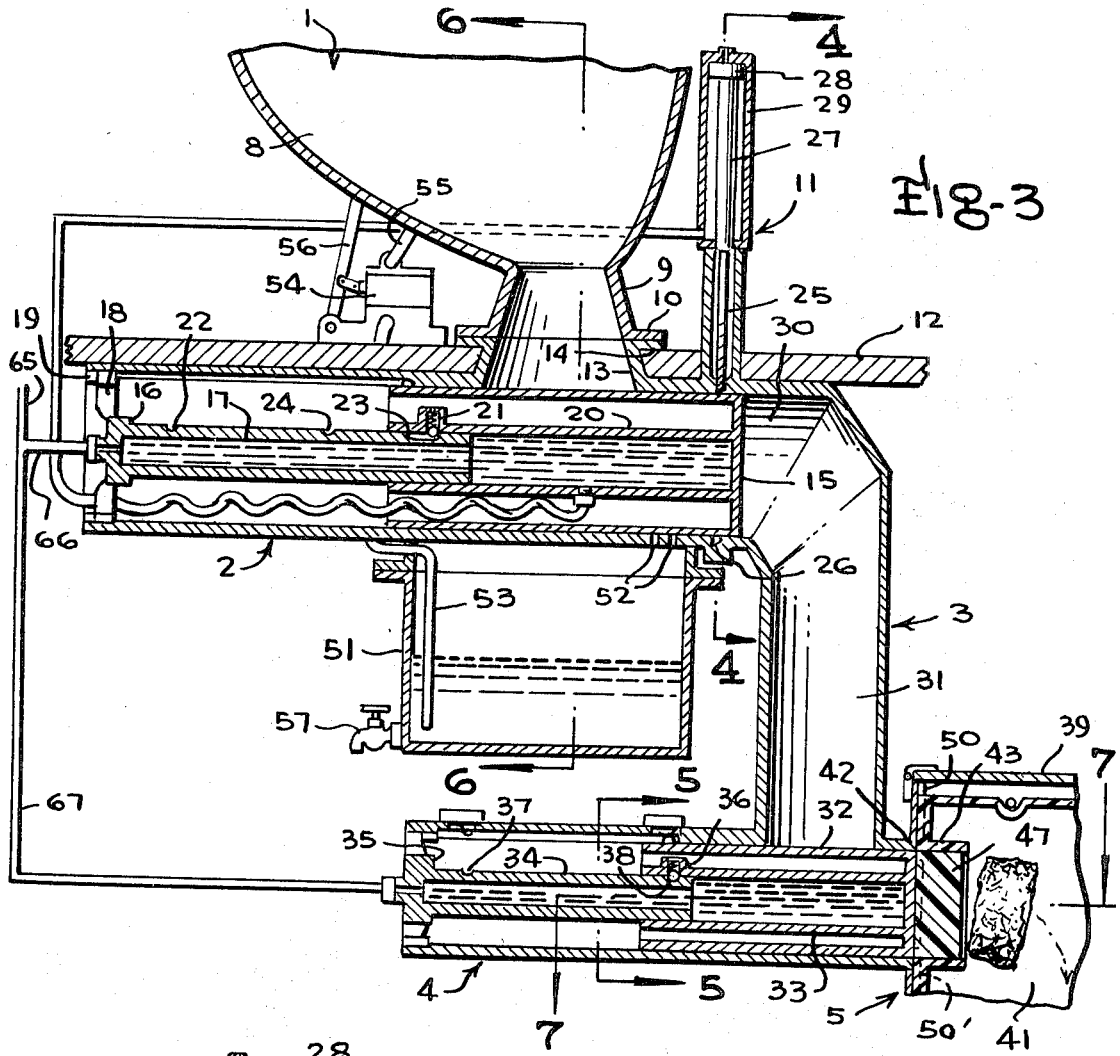
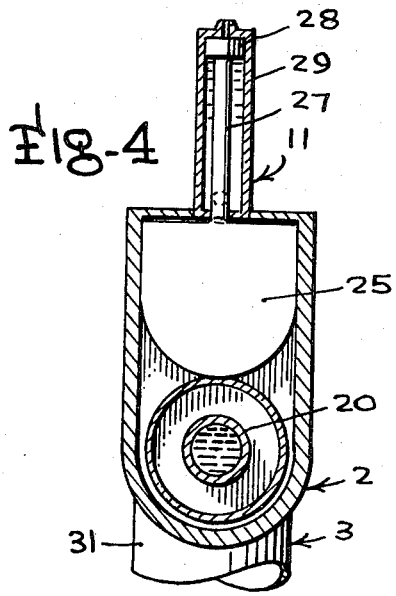
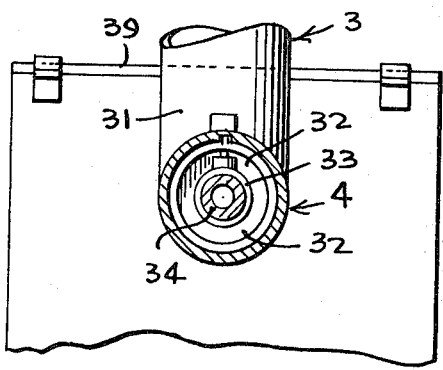
INVENTOR
SAMUEL BOTSFORD
BY
Mason, Fenwick & Lawrence
ATTORNEYS Aug. 4, 1970   S. BOTSFORD   3,522,613
WASTE DISPOSAL SYSTEM
Filed Oct. 21, 1968   5 Sheets-Sheet 3
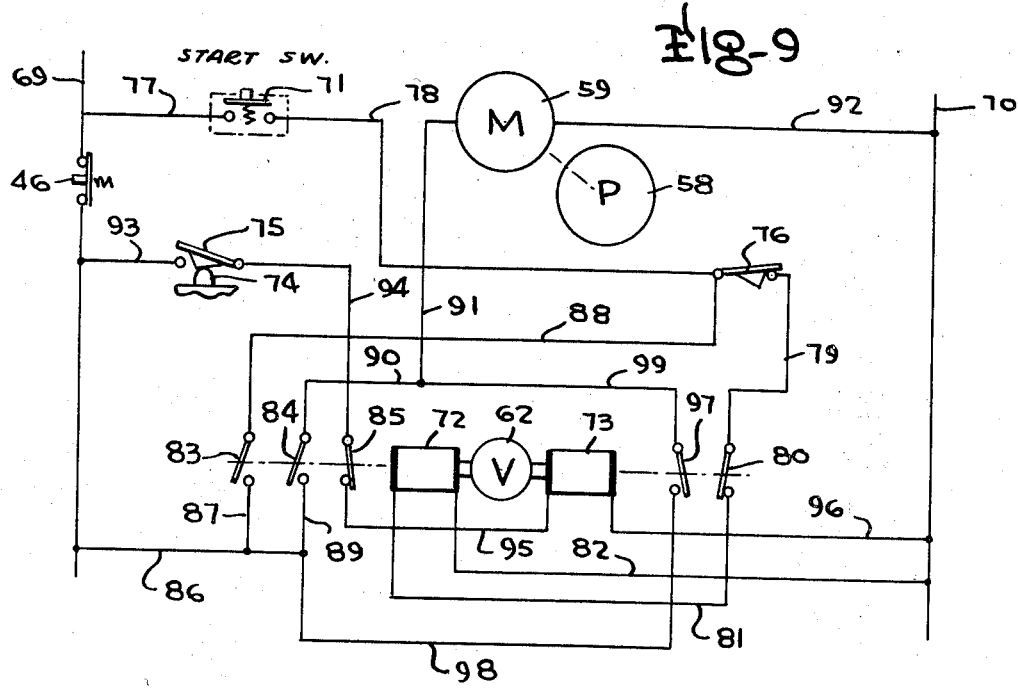
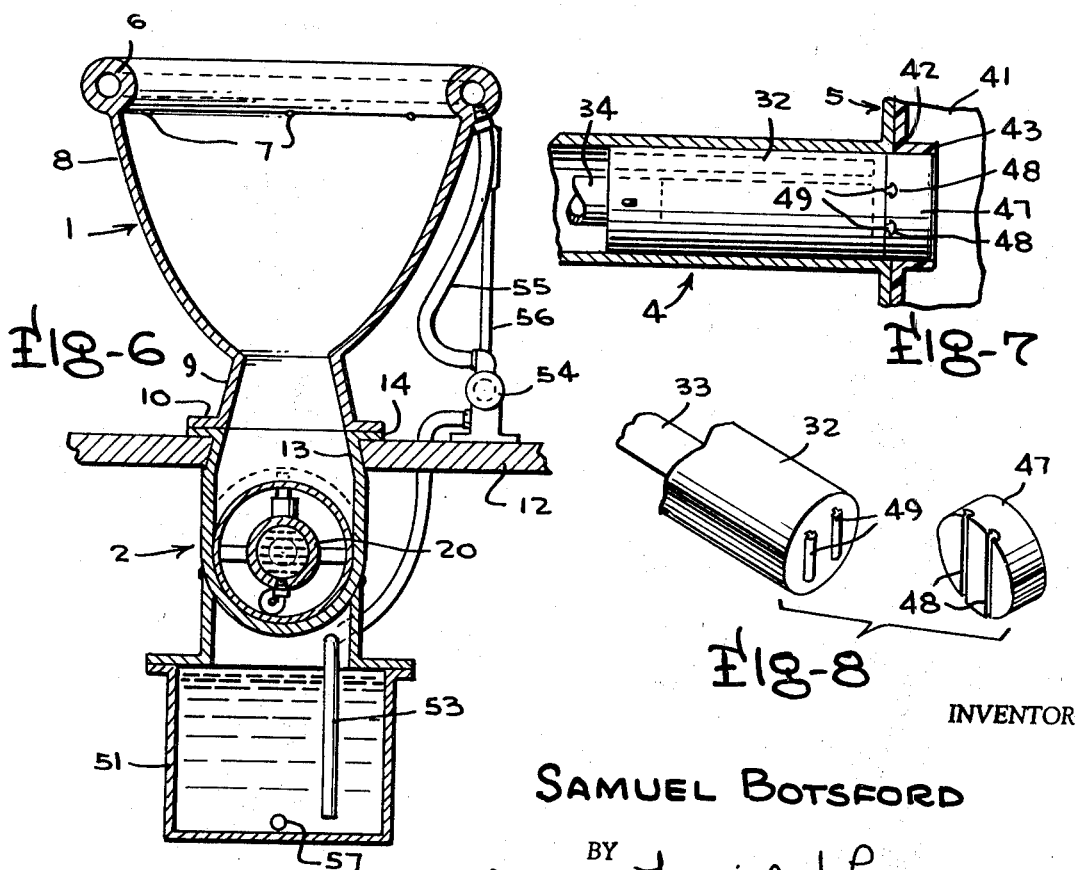
INVENTOR
SAMUEL BOTSFORD
BY
Mason, Fenwick & Lawrence
ATTORNEYS Aug. 4, 1970   S. BOTSFORD   3,522,613
WASTE DISPOSAL SYSTEM
Filed Oct. 21, 1968   5 Sheets-Sheet 4
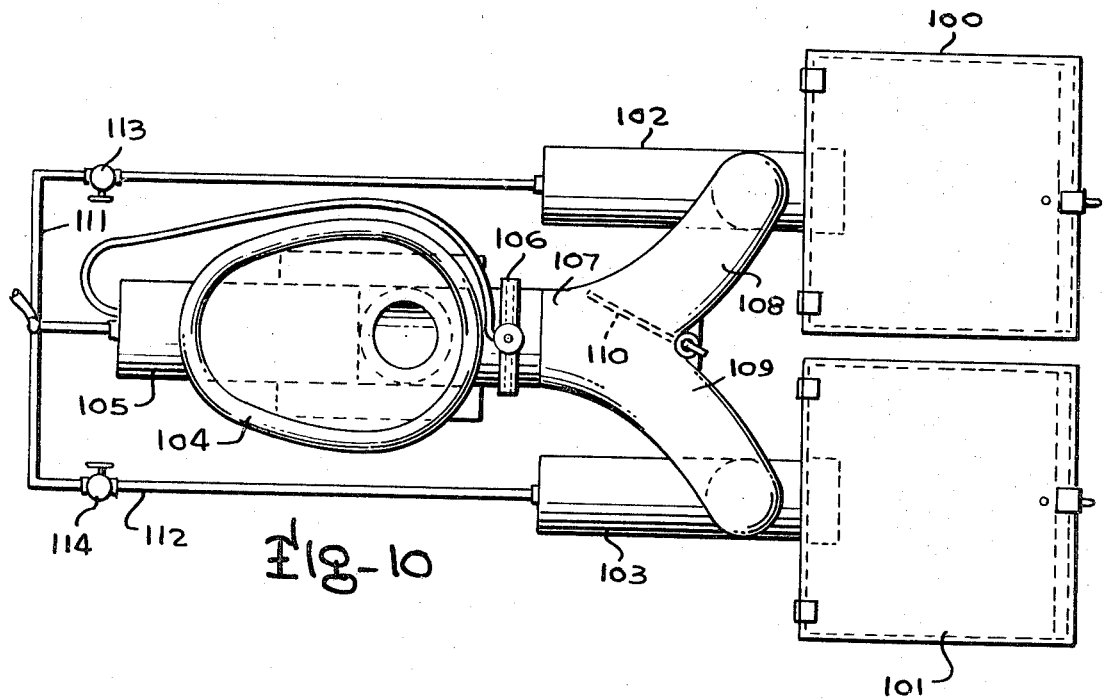
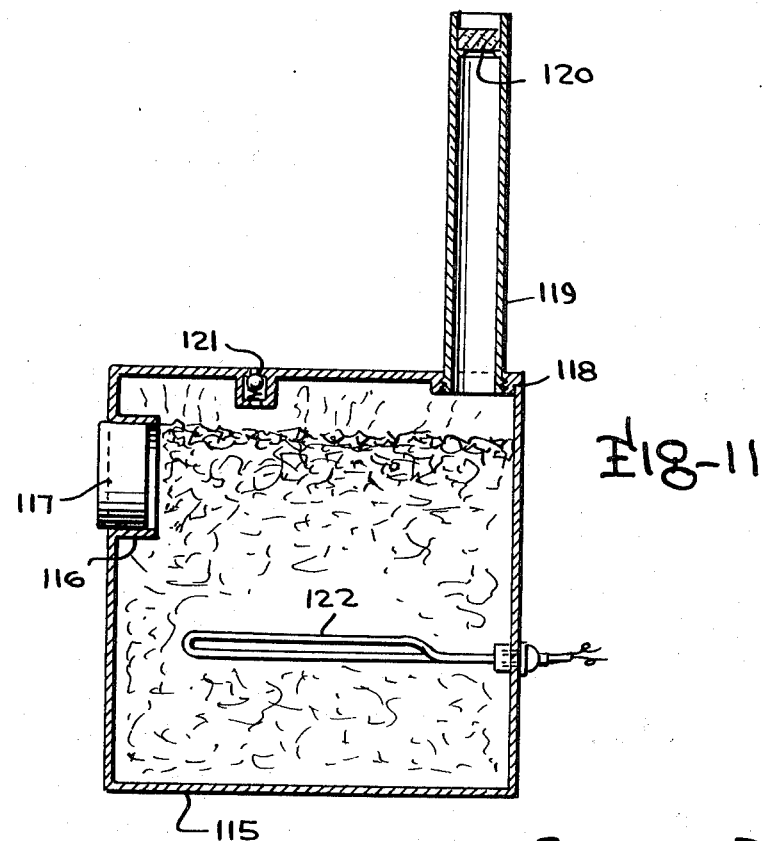
INVENTOR
SAMUEL BOTSFORD
BY Mason, Fenwick & Lawrence
ATTORNEYS

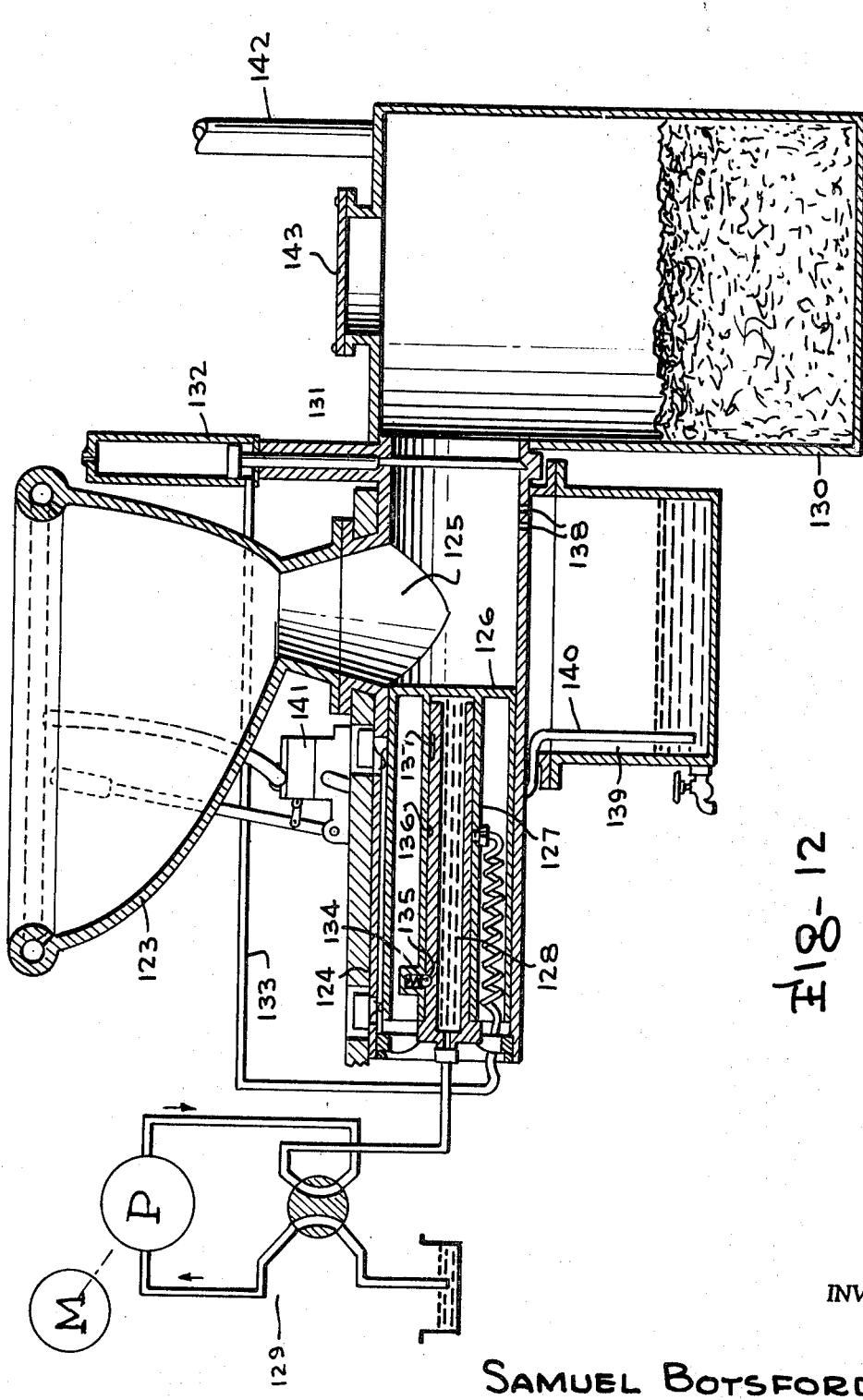

United States Patent Office 3,522,613
Patented Aug. 4, 1970

3,522,613
WASTE DISPOSAL SYSTEM
Samuel Botsford, Washington, D.C.
(P.O. Box 203, Branchport, N.Y. 14418)
Filed Oct. 21, 1968, Ser. No. 769,333
Int. Cl. A47k 11/02
U.S. Cl. 4—131   15 Claims

ABSTRACT OF THE DISCLOSURE

Human waste disposal system including toilet bowl mounted on a cylinder so that waste falls through bowl into cylinder. A piston moves waste forward and closes inlet from bowl. Gate valve lifts and piston pushes waste into tank. In another form, piston pushes waste past the gate valve into vertical pipe leading to second cylinder having piston to push waste into tank. Liquids drain from cylinder into purifying tank and are used to clean bowl and cylinder. Piston and valve operation may be hydraulic and automatic. Waste tank may have removable container or waste may be consumed in container by heat, bacterial action, or chemicals, or any combination of these.

BACKGROUND OF THE INVENTION

This invention relates to systems for the disposal of human wastes, and particularly to such systems especially adapted for use in mobile, or stationary, housing or travel facilities which are beyond the reach of normal sewage systems.

Most disposal systems for human wastes use water as a means to transport the waste to a treatment plant, or to a disposal area. Treatment plants are intended to remove impurities from the carrier water and return the purified water to its environment. Most deposit areas are designed for, at least, separation of the wastes from the water and return of the water to the ground. In practice, however, much raw sewage is emptied directly into lakes, streams, and other bodies of water, while partially treated water also empties into the water bodies, and seepage from septic tanks and cesspools goes into both underground and surface waters.

Water pollution has become a major problem, mainly because of inadequate fixed sewage disposal systems, but also because of improper waste disposal from mobile units, such as boats, trailers, etc. Many boats empty wastes directly into the water on which they float, and even those boats and trailers that have accumulating tanks have limited capacity, due to the large quantities of water used in flushing, and must be emptied frequently. It is not always practical, or possible, to get to a service area as often as, and when, required.

SUMMARY OF THE INVENTION

The general object of the present invention is to provide an independent disposal system which does not use water for the transport of human waste.

A more specific object is the provision of such a system wherein waste solids are forcibly ejected by mechanical means from a receiving area into a collection tank.

Another object is to provide a system having one or more collection tanks for the accumulation of solid wastes, wherein the tank has operable means to admit waste to the tank, but to close off the tank during all other times.

A further object is to provide a disposal system having a collection tank with mechanical means for moving waste into the tank wherein the waste-moving means carries a tank closure element which is seated in the tank inlet each stroke of the mechanical means, and can be removed with the tank when the mechanical means is in extended position.

Still another object of the invention is to provide an independent, closed sanitary system which, in its simpliest form, can readily accommodate to very small space and weight limitations, and is adaptable to manual operation.

Yet a further object is the provision of a closed system which, in a sophisticated form, can be completely automatic in operation.

Other objects of the invention will become apparent from the following description of practical embodiments thereof, when taken in conjunction with the drawings which accompany, and form part of, this specification.

BRIEF DESCRIPTION OF THE DRAWINGS

FIG. 1 is a vertical section taken through a human waste disposal system embodying the features of the present invention;

FIG. 2 is a perspective view of a collection tank removed from the system;

FIG. 3 is a view of the principal parts of the structure shown in FIG. 1 as they appear at the end of an operative stroke;

FIG. 4 is a vertical, transverse section taken on the line 4—4 of FIG. 3;

FIG. 5 is another vertical, transverse section taken on the line 5—5 of FIG. 3;

FIG. 6 is still another vertical, transverse section taken on the line 6—6 of FIG. 3;

FIG. 7 is a horizontal section taken on the line 7—7 of FIG. 3;

FIG. 8 is a perspective view of one end of one of the ejecting pistons and the tank closure member, illustrating the means for attachably connecting the two;

FIG. 9 is a diagram of an electric circuit suitable for operating the device;

FIG. 10 is a top plan view of a modified structure employing two collection tanks;

FIG. 11 is a vertical section through a collection tank having means to dispose of collected waste; and FIG. 12 is a view similar to FIG. 1, illustrating a simplified form of the invention.

DESCRIPTION OF THE PREFERRED EMBODIMENTS

In general, the invention contemplates a closed system which, in its simplest form, includes a toilet bowl mounted up a horiontal cylinder through which a piston is movable to push waste deposited in the cylinder into a tank into which the cylinder opens. A gate valve closes the entrance into the tank, except during the active stroke of the piston's cycle of movement. A small quantity of water may be used to cleanse the bowl and exposed portions of the cylinder, but this is not used as a flushing means, or as a means for transporting the waste.

Referring to the drawings in detail, and first to that form of the invention illustrated in FIGS. 1 to 9, there is shown a toilet bowl 1 fixed to one side of, and open to, a horizontally positioned cylinder 2. The cylinder has its end in communication with a connecting pipe 3 opening into a second cylinder 4. This cylinder opens into a waste receiving tank 5.

Bowl 1 may be of any desired type. It is shown as having an upper rim 6, which forms a water conduit and has downwardly directed water outlets 7, a bowl proper 8, and a base 9 with a surrounding mounting flange 10. These various elements may take any shape and be of any desired mateial.

The upper cylinder 2 is open-ended, and may be integral with the connecting pipe 3, or separated from it at the plane of a gate valve 11 which divides the cylinder area from the remainder of the waste flow path. The cylinder may be mounted conveniently below a floor, or deck, 12, and has an upstanding inlet 13 with a surrounding flange 14 upon which the flange 10 of the bowl rests. The two may be joined in any suitable manner. The inlet is located near that end of the cylinder which is adjacent the gate valve 11, so that wastes dropping into the bowl will fall into the cylinder relatively close to the gate valve.

That portion of cylinder 2 on the other side of the inlet from the gate valve 11 contains a reciprocable piston 15. The piston, when in retracted position, seats against a shoulder 16 formed on a central, cylindrical chamber 17 which is coaxial with the cylinder 2. A mounting spider 18 fits within the end of the cylinder 2 to position the cylindrical chamber 17, and is held in place by ring nut 19 threaded in the end of the cylinder. The piston 15 has a hollow, central rod 20 which has a telescoping fit over the cylindrical chamber 17. The interior of the chamber 17 and the interior of the rollow rod 20 combine to form an expandable chamber for fluid to operate the piston 15.

The hollow rod 20 carries a spring-pressed ball 21 which is adapted to seat in a plurality of recesses in the outer surface of the cylindrical chamber 17 to yieldably hold the piston in various positions of movement. When the piston is fully retracted, ball 21 seats in a recess 22 to hold the piston in retracted position until the force of the spring above the ball is overcome and the piston is free to move. In the fully extended position of the piston, ball 21 seats in the elongated recess 23. When the piston is in a position covering the inlet 13, ball 21 seats in a recess 24. Through the use of the spring-pressed ball, the piston can be caused to remain in certain designated positions until predetermined pressures within the hydraulic system have been built up. This can be used to cause sequential operation of various parts of the mechanism, as will be described.

Gate valve 11 includes a gate 25, vertically slideable and seatable in the groove 26 formed in the wall of the upper cylinder 2, or at the juncture of the cylinder and connecting pipe 3 as the case might be. The gate has its edge tapered to provide a knife edge on the side near the piston 15. The gate is connected to a piston rod 27 carried by a piston 28, movable in an operating cylinder 29. Movement of the piston along the cylinder will raise and lower the gate 25 to open and close the passageway from cylinder 2 to connecting pipe 3.

Connecting pipe 3 is merely a conduit through which wastes pushed forward by piston 15 will travel to enter the receiving area of the lower cylinder 4. The pipe has a horizontal entrance end 30 leading from the gate valve, and a connecting vertical leg 31 through which waste can drop by gravity into a lower cylinder 4.

Lower cylinder 4 is very similar to the upper cylinder 2. It, too, contains a piston 32 having a hollow piston rod 33 telescopically mounted over the cylindrical chamber-forming member 34 mounted in the end of the cylinder 4. The member 34 has an abutment 35 against which the piston rod strikes when the piston is at its fully retracted position. The piston rod carries a spring-pressed ball 36 which seats in a recess 37 in the chamber wall 34 when the piston is fully retracted, and a recess 38 in the chamber wall when the piston is fully extended.

The cylinder 4 extends beyond the opening of the pipe 3 into its top and is connected to the waste tank 5. This tank may be of any desired size or shape, and is provided with a hinged top 39, which may be secured in closed position and locked by means of a keeper 40. The tank 5 serves as the holder for a waste-receiving container 41. This can be any box-like structure which fits within the outer tank. The container has a circular inlet 42 surrounded by an inwardly projecting neck 43. The container will be so proportioned that when it is seated on the bottom of the tank 5 the inlet 42 will be in alignment with the open end of the lower cylinder 4. This will provide open communication from the cylinder into the receiving tank. The tank may have a pivoted baffle 44 connected to a plunger 45 which extends through an opening in the top of the container for contact with the operating button of a switch 46 carried by the top 39 of the waste tank 5. When wastes accumulate in the container 41 to the point that the container is approximately full, the pressure of the waste will cause the pivoted baffle 44 to move upwardly and the plunger 45 will operate to close switch 46. This will completely shut off the operating circuit of the device, as will be described.

When the waste container is full, it may be removed from the system and replaced by an empty one. Before removal, the tank inlet 42 will have to be plugged. To this end, plugs 47 are provided which will fit within the neck 43. It is contemplated that the plugs will be inserted in the neck by means of the piston 32 of the lower cylinder 4. The plugs can have one or more vertical recesses 48 to fit over, and be engaged by, ribs 49 on the end of piston 32. By having the ribs and recesses of similar cross section, the plugs can be secured to the piston end to move with the piston. Each time the piston moves to its extended position, its end will be flush with the innerface of the waste tank 5 and the plug carried by the piston will be seated within the neck 43 of the waste container. When the container is full, the top of the waste tank will be raised and the container 41 will be lifted vertically out of it. As this takes place, the plug slides off the ribs on the piston end and remains as a closure for the container. When an empty container is inserted in the tank, it will have a plug in place and the plug will automatically engage with the piston end. When the piston is withdrawn, the plug will be moved out of the opening leaving the lower cylinder in open communication with the waste container. In view of the fact that the ribs 49 project beyond the face of the piston 32, it is necessary that the waste container have vertical grooves 50 in alignment with the grooves in the plug. These grooves will slip over the ribs 49 in both removing and replacing a container. The wall of the tank may also be fitted with ribs 50', in alignment with the ribs 49 of the piston. In that event, these ribs will engage the grooves of the container and hold it firmly against the wall of the tank during filling. Of course, all ribs and their cooperating grooves can be aligned horizontally if lateral removal and replacement of the container is preferable in certain situations. The neck of the container can be so designed that as the container is removed, the plug can be sharply tapped and frictionally held within the neck. Or any of several other means of securing the plug can be provided.

In order to wash off the inner surface of the receiving chamber of the upper cylinder 2, a container 51 for water will be provided beneath the upper cylinder 2. Suitable drain openings 52 are formed in the bottom of the cylinder 2 to permit liquid to run through the chamber to return to the collection container 51. The water may be drawn from the container by any simple system such as a pipe 53 from the bottom of the container to the pump 54, and a second pipe from the pump to the rim 6 of the toilet bowl 1. Pump 54 may be operated by depression of a foot pedal or by a hand lever 56 as shown.

All liquid which falls into the receiving chamber of the upper cylinder will drain into tank 51. As this will include fluid wastes, and the liquid in the tank is to be re-used as a cleansing liquid, the tank will be initially partially filled with a chemical mixture, such as a common bleaching fluid, to neutralize the wastes. This will keep the collected fluid germ free and virtually colorless and orderless. Additions of chemical can be made periodically as may be required. The disposal of excess fluid in the container offers no problem, as the fluid is neutralized and can be drained at any place the vehicle may be. To this end, an outlet valve 57 is shown mounted at the base of the tank.

It is contemplated that the pistons 15 and 32 are to be actuated by either air or fluid. This is true also of the gate valve 11. A system for operating the pistons has been shown somewhat diagrammatically in FIG. 1. The actuating fluid is moved through the system by means of a pump 58 which is driven by a motor 59. If liquid is to be used as the operating medium, fluid will be drawn from a reservoir 60 through a pipe 61 to a control valve 62. From there, the fluid will flow through a pipe 63 to the pump 58, and through a pipe 64 from the pump back to the valve 62. A pipe 65 leads from the valve 62, and it has a branch 67 opening to the cylindrical chamber 17 of the upper cylinder 2, and a branch 67 leading to the chamber 34 of the lower cylinder 4. A flexible line 68 is connected to the hollow piston rod 20 of the uper piston 15, and leads to the bottom of the operating cylinder 29 of the gate valve 11. The connection of the line 68 to piston rod 17 is at such a point that the line will be closed by the outer wall of the chamber 17 when the piston is in fully retracted position. The line 68 will not be opened until the piston 15 has moved forward a sufficient distance to completely cover the inlet 13, so that the gate valve cannot open until after the toilet bowl has been sealed by the piston.

It is contemplated that when the pump starts, pressure will be built up within the chamber 17 against the inner wall of the piston 15, and within the chamber 34 against the inner wall of the piston 32. In order to achieve the desired sequence of operation, the spring-pressed ball 36 is much stronger in its operation than the spring-pressed ball 21. Therefore, the ball 21 will be raised and the piston 15 will move at a lesser pressure than that required to unseat ball 36 and allow movement of the piston 32. Therefore, piston 15 will move first to close the inlet 13 and approach the gate 25. At the time ball 21 reaches recess 24, the flexible line 68 will be uncovered and in communication with the fluid within the chamber formed by the chamber 17 and the projected portion of the hollow piston rod 20. This will cause a momentary decrease in pressure in the line, so that the piston 15 will not move further, but fluid will flow through line 68 into cylinder 29 beneath piston 28 and raise piston 28, lifting the gate 25 from bridging relationship across the mouth of the horizontal entrace end 30 of the connecting pipe 3. When piston 28 reaches its upper limit of movement, pressure will again build up in chamber 17 and cause ball 21 to be unseated and piston 15 to move to its fully extended position. At this time, the piston will extend across the gate valve so that it will be impossible for the gate to close. The ball 29 will now be at the far end of the elongated recess 23 in the chamber wall. This is as far as piston 15 can move, and pressure will continue to build up in the line until ball 36 is unseated and piston 32 moves forward. The piston will move throughout its full stroke. This completes the movement of the various parts in waste ejecting.

When piston 32 reaches its limit of movement, it causes the valve 62 to reverse (by means to be described) so that the fluid, whether it be liquid or air, will move through the pump in the reverse direction. This will cause the fluid to be withdrawn from the various cylinder chambers, and vacuum to be built up in its place. The vacuum would act first upon the gate valve, but the gate valve is held against movement due to the position of the piston 15 across the plane of the gate. Therefore, piston 15, due to the weaker action of the spring-pressed ball 21 will start its rearward movement. During the first movement, the ball 21 merely moves along the elongated recess 23, to allow the piston to move back until it has just cleared the gate position. The ball 21 will now be at the opposite end of the recess 23 and stop further movement of piston 15. Gate 25 will now fall, and it will scrape across the face of piston 15 clearing away any waste that may have adhered to the piston. As soon as the gate seats in closed position, the vacuum will increase and piston 15 will move back to its fully retracted position. During this final movement, the telescoping action of the piston rod over the chamber 24 will close off pipe 68 so that the gate valve cylinder is no longer in communication with the pump. As soon as the piston 15 reaches its fully retracted position against the shoulder 16, the vacuum can again build up and cause the piston 32 to retract. When piston 32 contacts the abutment 35, the full cycle of operation of the several pistons has been completed.

The operation of the pistons can be started, reversed and stopped by means of a simple electric system, such as that shown in FIG. 9. In this circuit, an input line is shown at 69 and a return line at 70. A manually operated starting switch 71 initiates the cycle of operation which causes solenoids 72 and 73 to rotate valve 62 to its two positions and, at the same time, open and close certain circuits, to hold the circuits after the switch 71 is released, and to reverse the circuits after the two pistons have reached their fully extended positions. Piston 32 carries a switch actuator 74 which contacts, and opens, a switch 75 when the piston is in retracted position, and contacts and opens a switch 76 when the piston has reached its fully extended position. When switch 71 is closed, it completes a circuit from line 69, through line 77, switch 71, line 78, switch 76, line 79, normally closed relay contact 80, line 81, the coil of relay 72 and line 82 to the return line 70. This causes relay 72 to be energized, closing its normally open contacts 83 and 84, and opening its normally closed contact 85. When this occurs, the current flow will be from line 69 through line 86, line 87, now closed contact 83, line 88, switch 76, line 79, relay contact 80, line 81, coil of relay 72 and line 82 to return line 70. Thus, a holding circuit is established to maintain the coil of relay 72 energized and the contacts in the position described. When relay 72 is energized, it moves valve 62 to its initial position for permitting fluid to be pumped to the several cylinders. At the same time that relay 72 is energized, motor 59 is started to operate pump 58. This circuit includes line 69, lines 86 and 89, now closed contact 84, lines 90 and 91, motor 59 and line 92 to return line 70. When piston 32 makes its ejecting movement, its abutment 72 moves away from switch 75 allowing that switch to close. When the piston reaches its fully extended position, abutment 74 strikes and opens switch 76. Of course, as soon as switch 76 is opened, relay 72 is deenergized. This allows contacts 83 and 84 to open and contact 85 to close. However, switch 75 is now closed, and when contact 85 closes upon the deenergization of relay 72, a circuit is established to energize relay 73 to turn valve 62 to its reversed position and to set up a new circuit through motor 59. This circuit includes line 69, line 93, now closed switch 75, line 94, now closed contact 85, line 95, the coil of relay 73 and line 96 to return line 70. As soon as coil 73 is energized, contact 80 opens and contact 97 closes. With the closing of contact 97, a circuit is set up from line 69 through lines 86 and 98, now closed contact 97, lines 99 and 91, motor 59 and line 92 to return line 70. This circuit will be maintained until piston 32 is fully retracted, whereupon switch 75 will be opened and all circuits will be inoperative until the starting switch 71 is again depressed.

The switch 46 at the waste tank may be included in the line 69, so that when the container being used becomes full, the switch will open to shut off all of the circuits. As the baffle 44 will be caused to operate only on the extended movement of piston 32, the piston will be in its proper position with the plug 47 in the neck 43 of the container at the time the circuits are broken. The circuits will not be re-established until a new container is in place and the top 39 of the waste tank closed. Thereupon, the pistons will complete their return cycle to their inoperative positions.

From the above description, it will be seen that when the toilet bowl is used, wastes will fall through the bowl and the inlet 13 and be deposited in the receiving chamber of the upper cylinder 2. If the wastes are liquid, they will drain through the openings 52 into the container 51. There the liquid will be neutralized by the chemical within the container. If only liquid is deposited, the pump 54 may be actuated to cause a small quantity of water to flow through the outlet 7 in rim 6 of the toilet bowl to wash out the unit. This water, of course, flows back into the container for reuse.

If the wastes are solids, the starting switch 71 will be pressed, which will start the motor and pump and build up the pressure necessary to operate the various pistons. First, the piston 15 will move forward to move the wastes toward the outlet end of the cylinder 2 and completely cover the inlet 13 to seal off the toilet bowl. At this time, the gate valve will lift and the piston 15 will continue its movement to push the wastes into the connecting pipe 3 so that they may fall by gravity through the vertical leg 31 of this pipe into the receiving chamber of the lower cylinder 4. The lower piston will then move forward pushing the wastes out of the cylinder into the container 41. As soon as this occurs, piston 15 will begin its backward movement, the gate valve will close and the gate 25 will scrape the face of the piston 15. The piston 15 then returns to its fully retracted position, again opening the inlet 13. Piston 32 next retracts and disconnects the operating circuit. If the expelling movement of piston 32 completed the filling of a container 41, the baffle 44 would be moved and switch 46 closed to cut off the circuit. Of course, if desired, this switch could also actuate a signal light or buzzer. The top 39 of the waste tank 6 will then be opened and the waste container lifted out to remove the plug 47 from the end of the piston, while leaving the piston in its extended position. An empty container with the plug 47 in place will then be inserted so that the grooves of the plug will engage the ribs of the piston and the grooves of the waste container will engage the ribs of the tank and hold the container in position. The top of the waste tank will be closed and the device is again ready for operation.

It is contemplated that after each use of the system, a small quantity of liquid will be pumped from the tank 51 to clean the bowl and receiving chamber of the upper cylinder 2. This requires but a small amount of water, and the water can be reused after chemical treatment. At no time, however, is water used as the transporting medium for the wastes. Therefore, the accumulating space required for waste is relatively small, and replacement of the waste containers is infrequent. The waste within the container will be free, or relatively free, from liquid.

FIG. 10 shows a slightly modified arrangement wherein two waste tanks are employed. These tanks are shown at 100 and 101. Two lower cylinder assemblies, 102 and 103, will be required, one for each tank. The toilet bowl 104 will be mounted on top of an upper cylinder 105 as before. There will also be a gate valve 106 as in the previous arrangement. Instead of a single connecting pipe, a Y-shaped pipe 107, having branches 108 and 109 will be employed. By using a pivoted baffle 110, either branch line of the connecting pipe can be opened while the other is closed. This will allow the use of first one tank and then the other. While the operating fluid lines are substantially the same with this form of the invention, two fluid lines, 111 and 112, will be required, one leading to each of the lower cylinders. Valves 113 and 114 can be included in these lines so that either line may be opened while the other is closed. In all other respects, the operation of the system of FIG. 10 will be as that of the first-described form.

FIG. 11 shows a modified form of waste container. The container 115 is the same type of enclosure as before, having an inlet 116 to be closed by a plug 117. At the top of the container, however, a threaded opening 18 has been provided to receive a removable flue 119. The flue is threaded at its lower end for engagement with the opening 118. The flue should be equipped with a filter 120 to prevent the escape of flyash from the container while permitting the free flow of combustion gases. There is also a check valve 121 located in the top through which air to support combustion, or chemicals to aid combustion, may be inserted into the container. Heating means, shown as an electric heating element 122, is mounted so as to extend substantially across the container.

With this form of container, anaerobic bacteria, aided by low heat, will convert the wastes in a filled container to a dry, somewhat fibrous, material within a relatively short time. This material can be ignited by the electric grid, and then burned with a steady, low volume injection of air. This arrangement will take advantage of the fuel-like properties inherent in bacteria depleted wastes, so that they would be consumed with their own heat generating capacities. Although there would be a somewhat larger residue of ash than would in the case if high heat incineration were used, the slow, low, heat burning would avoid insulation problems, and result in a virtually self-contained system. It may be desirable, to add small amounts of granulated charcoal periodically while the container is being filled in service to assure thorough burning the waste material.

A somewhat simpler version of the system is shown in FIG. 12. In this form, as in the previously described form, a toilet bowl 123 is mounted upon a horizontal cylinder 124, with the toilet bowl being open to the receiving chamber of the cylinder through the inlet 125. There is a piston 126 in the cylinder and it has a hollow rod 127 telescopically mounted over a cylindrical chamber-forming member 128 extending coaxially to the cylinder from one end. The chamber and the hollow piston combine to form an expanding fluid receiving chamber. The fluid is supplied through a fluid system 129, which is identical to the previously described system. The cylinder is connected to a waste tank 130, and a gate valve 131 bridges the entrance into the waste tank. The gate valve is operated by cylinder 132, fed by a fluid line 133, as in the previous form. The piston rod 127 carries a spring-pressed ball 134 which cooperates with the recesses 135, 136 and 137 to hold the piston in its several previously-described positions. Cylinder 124 has outlet openings 138 at its bottom in the receiving chamber area to allow liquid waste to pass from the receiving chamber into a liquid tank 139 mounted beneath the cylinder. A fluid line 140 and a pump 141 serve to provide for circulation of liquid from the tank through the bowl to clean the bowl and cylinder receiving chamber.

The system of FIG. 12 will operate substantially the same as the previously described system, but it will not have the double action provided by the two cylinders. In this form, waste will fall into the receiving chamber of the cylinder 124 and be pushed toward the waste tank 130 by the piston 126. As soon as the piston has covered the inlet 125 and the spring-pressed ball 124 reaches the recess 136, the piston will stop its movement and, as the fluid line 133 is now open, the gate valve will be raised. The piston will then continue its full extended movement to push wastes from the cylinder into the waste tank. The piston will start its return stroke and move back to a point where it has just cleared the plane of the gate. At this time, the gate will move down scraping the face of the piston and closing the passageway. The piston then moves back to its fully retracted position leaving the inlet 125 open, and the system in condition for use. If required, the pump 141 can be actuated to flush out the toilet bowl, inlet and cylinder receiving chamber.

The waste tank shown in FIG. 12 is designed to receive the waste directly. Therefore, it is provided with a ventilating pipe 142, and an access cover 143. It will be understood, of course, that the same type of tank and removable container may be used as that discussed in connection with the first-described form of the invention.

It is to be noted that in all forms of the invention which have been disclosed, the systems provide for the separation of liquids from solids and for the collection of solids for subsequent removal or disposal. In no case is water used as a transporting means for solids and, if water is used, it is used in small quantities as a cleaning agent only. The systems can remain in service for long periods of time without removal of the wastes, and in those systems where dual receiving tanks are used, the wastes can be diverted to a second tank after the first one is filled and ample time will be provided to get to a disposal area. Where the tanks are equipped with heating elements, as in FIG. 11, the in-service periods of the system are almost limitless.

While in the above, several embodiments of the invention have been disclosed, it will be understood that the particular details of structure shown and described are merely by way of illustration, and the invention may take other forms within the scope of the appended claims.

What is claimed is:

1. Disposal system for human wastes comprising, a horizontally positioned cylinder having an opening near one end, means forming a seat above and in communication with an opening in the cylinder, a piston having a retracted position in the other end of the cylinder, a waste tank connected to and open to the cylinder at said one end, means to close off the cylinder located between the opening and the tank, means to move the cylinder closing means to open position, and means to move the piston through the cylinder to transfer wastes deposited in the said one end of the cylinder into the tank.

2. Disposal system for human wastes as claimed in claim 1 wherein, there is a liquid tank beneath the cylinder below the opening, the cylinder having outlets for the passage of liquids from the cylinder to the liquid tank, and means to draw liquid from the liquid tank and discharge it into the opening in the cylinder.

3. Disposal system for human wastes as claimed in claim 1 wherein, there is means to prevent the means to move the cylinder closing means to open position from operating until the means to move the piston has caused the piston to cover the cylinder opening.

4. Disposal system for human wastes as claimed in claim 1 wherein, there is a removable waste container in the waste tank having an inlet aligned with the cylinder when the container is in place in the waste tank.

5. Disposal system for human wastes as claimed in claim 4 wherein, there is means to close the container inlet removable with the container.

6. Disposal system for human wastes as claimed in claim 1 wherein, there are means within the waste tank to burn wastes accumulated in the tank.

7. Disposal system for human wastes as claimed in claim 1 wherein, the means forming a seat is a toilet bowl.

8. Disposal system for human wastes comprising an upper horizontally positioned cylinder having an opening near one end, a toilet bowl connected to the cylinder in open communication with the opening, a piston in the cylinder having a retracted position in the opposite end of the cylinder leaving the opening uncovered, a lower cylinder having an opening near one end, a connecting passage in communication with the said one end of the upper cylinder and the opening in the lower cylinder, a piston in the lower cylinder having a retracted position in the opposite end of the lower cylinder leaving the opening uncovered, a waste tank connected to and open to said one end of the lower cylinder, a gate valve normally closing the upper cylinder between the opening in the upper cylinder and the said one end, and means to cause the piston in the upper cylinder to move forward to cover the opening in the upper cylinder, open the gate valve, continue the movement of the piston in the upper cylinder to eject waste from the upper cylinder into the passageway connecting the upper and lower cylinders, to move the piston in the lower cylinder to push wastes deposited in the lower cylinder into the waste tank, and to return the pistons to their retracted positions and the gate valve to its closed position.

9. Disposal system for human wastes as claimed in claim 8 wherein, the piston in the upper cylinder has a waste-contacting face, and there are means to stop the piston in the upper cylinder with its waste-contacting face at the plane of the gate valve on its return to retracted position, whereby the closing gate valve can scrape the waste-contacting face as the valve returns to closed position.

10. Disposal system for human wastes as claimed in claim 9 wherein, there is collection container in the waste tank having an inlet aligned with the lower cylinder when the container is seated in the waste tank, a plug for the container inlet, the piston in the lower cylinder and the plug having mating elements to connect the plug to the lower cylinder piston, the plug being removable from the lower cylinder piston by movement vertically, whereby the plug can be removed with the container when the piston is moved forward to insert the plug in the container inlet and the container is lifted vertically from the waste tank.

11. Disposal system for human wastes as claimed in claim 10 wherein, there are means in the waste container to burn collected wastes.

12. Disposal system for human wastes as claimed in claim 11 wherein, there are means in the waste container to allow injection of air and other materials to support combustion.

13. Disposal system for human wastes as claimed in claim 8 wherein, there is a liquid tank beneath the upper cylinder below the opening in the upper cylinder, the upper cylinder having liquid outlets communicating with the liquid tank, and means to pump small quantities of liquid from the liquid tank into the toilet bowl for cleansing the toilet bowl and upper cylinder.

14. Disposal system for human wastes an claimed in claim 8 wherein, there is a second lower cylinder having a piston and connected to a second waste tank, the passageway from the upper cylinder being divided and having one leg leading to each lower cylinder, and a baffle movable to selectively close either of the legs of the passageway.

15. Disposal system for human wastes as claimed in claim 14 wherein, there are means to selectively activate the piston in either of said lower cylinders.

References Cited

UNITED STATES PATENTS 3,457,567  7/1969  Criss _____ 4—132

FOREIGN PATENTS 1,400,325  7/1963  France.

LAVERNE D. GEIGER, Primary Examiner

R. J. SHER, Assistant Examiner

U.S. Cl. X.R.

4—111, 133